United States Patent [19]
Inaniwa et al.

[11] Patent Number: 5,726,550
[45] Date of Patent: Mar. 10, 1998

[54] MOTOR CONTROL SYSTEM FOR CENTRIFUGE

[75] Inventors: Masahiro Inaniwa; Shinji Watanabe; Noriyasu Matsufuji, all of Hitachinaka; Katsunori Akatsu, Hitachi, all of Japan

[73] Assignee: Hitachi Koki Co., Ltd., Tokyo, Japan

[21] Appl. No.: 689,108

[22] Filed: Jul. 30, 1996

[30] Foreign Application Priority Data

Aug. 11, 1995 [JP] Japan ................. 7-205849

[51] Int. Cl.⁶ ................................. H02P 3/26
[52] U.S. Cl. ............... 318/803; 318/376; 318/801; 318/269; 318/758; 363/37; 363/39
[58] Field of Search ...................... 318/729, 376, 318/448, 759, 377, 803, 762, 254, 758, 801, 807, 808, 809, 800, 802, 269, 272; 363/37, 39, 36, 40, 41, 71, 34

[56] References Cited

U.S. PATENT DOCUMENTS

| | | | |
|---|---|---|---|
| 4,788,485 | 11/1988 | Kawagishi et al. | 318/811 |
| 4,902,954 | 2/1990 | Oshima et al. | 318/762 |
| 5,070,290 | 12/1991 | Iwasa et al. | 318/758 |
| 5,175,439 | 12/1992 | Harer et al. | 363/37 |
| 5,471,125 | 11/1995 | Wu | 318/803 |
| 5,504,667 | 4/1996 | Tanaka et al. | 363/37 |
| 5,631,813 | 5/1997 | Ikeshita | 363/37 |

*Primary Examiner*—John W. Cabeca
*Attorney, Agent, or Firm*—Pollock, Vande Sande & Priddy

[57] ABSTRACT

A motor control system for controlling power supplied to an electric motor rotating a rotor employed in a centrifuge is provided. The motor control system includes first, second, and third converters and first and second smoothing capacitors. In a motor power mode, the first converter operates to transfer the charged energy in the first smoothing capacitor to the second smoothing capacitor for providing power to the motor through the third converter, while the second converter transfers, in a motor braking mode, the charged energy in the second smoothing capacitor to the first smoothing capacitor to return the power regenerated by the motor during a braking operation to the AC power supply through the first converter. The second converter performs a function of providing an initial energizing energy to the motor for a given period of time at the start of the braking operation for stability of a power-regenerating operation of the motor.

4 Claims, 4 Drawing Sheets

5,726,550

MOTOR CONTROL SYSTEM FOR CENTRIFUGE

BACKGROUND OF THE INVENTION

1. Technical Field

The present invention relates generally to a motor control system for centrifuges, and more particularly to a motor control system for an electric motor used to rotate a rotor of a centrifuge, which is designed to improve the stability of an operation of the motor in a regenerating mode wherein rotational energy of the rotor is converted into electric energy and then returned to a power supply.

2. Background of Related Art

A conventional motor control system for a centrifuge designed to reduce harmonic components contained in the current supplied from or returned back to a power supply is known in the art. This system includes a bi-directional supply power-converting circuit and a motor power-converting circuit. The bi-directional supply power-converting circuit works as a step-up converter which converts alternating current into direct current of a higher voltage for activating an electric motor in a running mode of operation to rotate a centrifugal rotor through the motor power-converting circuit, while it works as a step-down converter which converts direct current produced by the motor through the motor power-converting circuit in a regenerating mode of operation into alternating current of a lower voltage and returns it to the power supply.

The conventional motor control system, however, has the drawback in that it is difficult to provide to the motor an initial energizing energy sufficient for starting the regenerating operation of the motor, resulting in instability of the system operation. This problem will also be discussed in the description of the preferred embodiments below.

SUMMARY OF THE INVENTION

It is therefore a principal object of the present invention to avoid the disadvantages of the prior art.

It is another object of the present invention to provide a motor control system for a centrifuge which is designed to establish the stability of an electric motor during a regenerating mode of operation, especially at the start of the regenerating mode.

According to one aspect of the present invention, there is provided a power control apparatus for controlling power supplied to an electric motor employed in a centrifuge which comprises a bi-directional supply power-convening circuit connected to an a.c. power supply, designed to convert a.c. current into d.c. current and vice versa and to reduce harmonic components contained in the current passing therethrough, the bi-directional supply power-converting circuit functioning as a step-up converter and a step-down converter, the step-up converter increasing a voltage level of the current flowing therethrough during conversion from the d.c. current into the a.c. current, the step-down converter decreasing a voltage level of the current flowing therethrough during conversion from the a.c. current into the d.c. current; a bi-directional motor power-converting circuit connected to the bi-directional supply power-converting circuit for providing power to the electric motor in a power running mode of motor operation and also providing power produced by the electric motor in a regenerating mode of motor operation to the bi-directional supply power-converting circuit; a d.c. power-converting circuit disposed between the bi-directional supply power-converting circuit and the bi-directional motor power-converting circuit, designed to work as a step-down converter which decreases a voltage level of an output from the bi-directional supply power-converting circuit to the bi-directional motor power-converting circuit and a step-up converter which increases a voltage level of an output from the hi-directional motor power-converting circuit to the bi-directional supply power-converting circuit; a motor energizing circuit disposed in parallel to the d.c. power-converting circuit to provide a given level of electric power to the electric motor to activate the electric motor in the regenerating mode; and a control circuit controlling operations of the bi-directional supply power-converting circuit, the bi-directional motor power-converting circuit, the d.c. power-converting circuit, and the motor energizing circuit to selectively activate the electric motor in the power running mode and the regenerating mode.

In the preferred mode, a first smoothing capacitor and a second smoothing capacitor are further provided. The bi-directional supply power-converting circuit includes rectifying elements connected to form a circular rectifying circuit and switching elements each connected to one of the rectifying elements in parallel. The bi-directional supply power-converting circuit is connected at an ac terminal to the a.c. power supply and at a d.c. terminal to the first smoothing capacitor for charging the first smoothing capacitor. The bi-directional motor power-converting circuit includes rectifying elements connected to form a circular rectifying circuit and switching elements each connected to one of the rectifying elements in parallel. The bi-directional motor power-converting circuit is connected at an ac terminal to the motor and at a d.c. terminal to the second smoothing capacitor. The control circuit controls, in the power running mode, the switching elements of the bi-directional motor power-converting circuit with given operational timing to supply power to the motor and also controls the d.c. power-converting circuit to function as the step-down converter acting on the first smoothing capacitor for charging the second capacitor at a preselected level, in the regenerating mode wherein the bi-directional motor power-converting circuit charges the second smoothing capacitor with power regenerated by the motor. The control circuit controls the switching elements of the bi-directional supply power-converting circuit with given operational timing for returning the power regenerated by the motor back to the a.c. power supply and also controls the d.c. power-converting circuit to function as the step-up converter acting on the second smoothing capacitor for allowing the first capacitor to be charged at a given level.

According to another aspect of the present invention, there is provided a power control apparatus for controlling power supplied to an electric motor employed in a centrifuge which comprises a bi-directional supply power-converting circuit connected to an a.c. power supply, designed to convert a.c. current into d.c. current and vice versa and to reduce harmonic components contained in the current passing therethrough, the bi-directional supply power-converting circuit functioning as a step-up converter and a step-down converter, the step-up converter increasing a voltage level of the current flowing therethrough during conversion from the d.c. current into the a.c. current, the step-down converter decreasing a voltage level of the current flowing therethrough during conversion from the a.c. current into the d.c. current; a bi-directional motor power-converting circuit connected to the bi-directional supply power-converting circuit for providing power to the electric motor in a power running mode of motor operation and also providing power produced by the electric motor in a regenerating mode of motor operation to the bi-directional supply power-converting circuit; a d.c. power-converting circuit disposed between the bi-directional supply power-converting circuit and the bi-directional motor power-converting circuit, designed to work as a step-down converter which decreases a voltage level of an output from the bi-directional supply power-converting circuit to the bi-directional motor power-converting circuit and a step-up converter which increases a voltage level of an output from the bi-directional motor power-converting circuit to the bi-directional supply power-converting circuit, the step-down converter also serving to provide energizing energy to the motor for starting the regenerating mode; and a control circuit controlling operations of the bi-directional supply power-converting circuit, the bi-directional motor power-converting circuit, and the d.c. power-converting circuit to selectively activate the electric motor in the power running mode and the regenerating mode.

In the preferred mode of the invention, a first smoothing capacitor and a second smoothing capacitor are provided. The bi-directional supply power-converting circuit includes rectifying elements connected to form a circular rectifying circuit and switching elements each connected to one of the rectifying elements in parallel. The bi-directional supply power-converting circuit is connected at an ac terminal to the a.c. power supply and at d.c. terminal to the first smoothing capacitor for charging the first smoothing capacitor. The bi-directional motor power-converting circuit includes rectifying elements connected to form a circular rectifying circuit and switching elements each connected to one of the rectifying elements in parallel. The bi-directional motor power-converting circuit is connected at an ac terminal to the motor and at a d.c. terminal to the second smoothing capacitor. The control circuit controls, in the power running mode, the switching elements of the bi-directional motor power-converting circuit with given operational timing to supply power to the motor and also controls the d.c. power-converting circuit to function as the step-down converter acting on the first smoothing capacitor for charging the second capacitor at a preselected level, in the regenerating mode wherein the bi-directional motor power-converting circuit charges the second smoothing capacitor with power regenerated by the motor. The control circuit controls the switching elements of the bi-directional supply power-converting circuit with given operational timing for returning the power regenerated by the motor back to the a.c. power supply and also controls the d.c. power-converting circuit to function as the step-up converter acting on the second smoothing capacitor for allowing the first capacitor to be charged at a given level. When the motor enters the regenerating mode through the bi-directional motor power-converting circuit, the d.c. power-converting circuit works as the step-down converter for providing the energizing energy to the motor for starting the regenerating mode.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENTS

Figure 1:
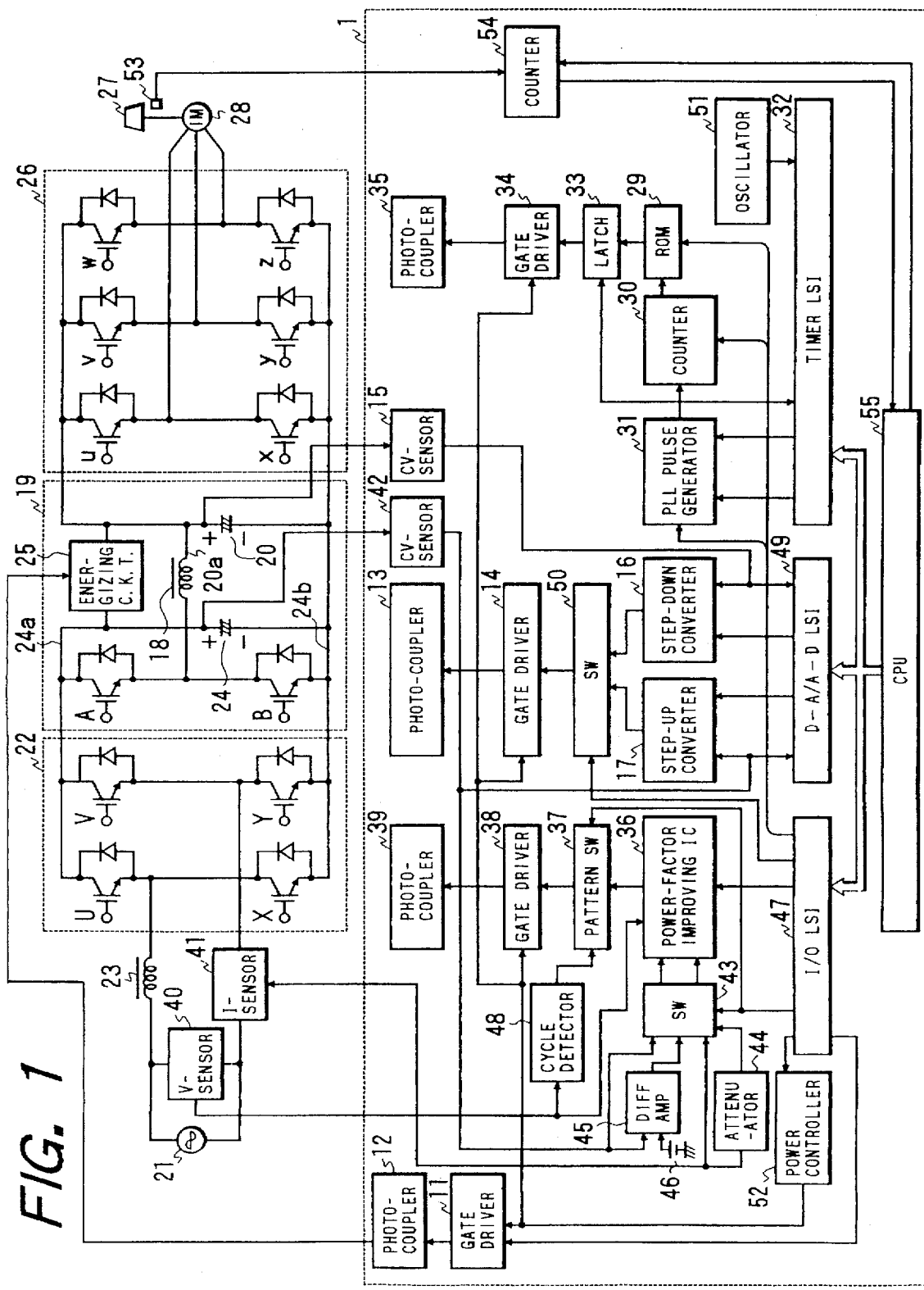
FIG. 1 is a block diagram which shows a motor control system for a centrifuge according to the present invention.

Referring now to the drawings, wherein like reference numbers refer to like parts in several views, particularly to FIG. 1, there is shown a motor control system for a centrifuge according to the present invention. This system is an improvement on the one taught in U.S. patent application Ser. No. 08/495,962, filed on Jun. 28, 1995, assigned to the same assignee as that of this application, the disclosure of which is incorporated herein by reference.

The motor control system includes generally a bi-directional supply power-converting circuit 22, a direct current power-converting circuit 19, a bi-directional motor power-converting circuit 26, and a control circuit 1.

The bi-directional supply power-converting circuit 22 includes rectifying devices constituting a circulating rectifier and power switching elements 22U, 22V, 22X, and 22Y such as transistors, IGBTs, FETs, or GTOs connected in parallel to the rectifying devices. The bi-directional supply power-converting circuit 22 is connected at alternating current terminals to an AC power supply 21 through a reactor 23 and at direct current terminals to a smoothing capacitor 24.

The bi-directional motor power-converting circuit 26 includes rectifying devices constituting a circular rectifier and switching elements 26u, 26v, 26w, 26x, 26y, and 26z similar to those of the bi-directional supply power-converting circuit 22, connected in parallel to the rectifying devices, and communicates at alternating current terminals with an induction motor 28 and at direct current terminals with a smoothing capacitor 20. The induction motor 28 rotates a rotor 27 disposed within a centrifuge (not shown).

The direct current power-converting circuit 19 serves to change voltages of direct currents flowing in opposite directions between smoothing capacitors 24 and 20, and includes switching elements 19A and 19B similar to those of the bi-directional supply power-converting circuit 22, a choke coil 18, and a motor energizing circuit 25. The switching elements 19A and 19B are arranged in series across the smoothing capacitor 24 through an anode line 24a and a cathode line 24b. The choke coil 18 is arranged between a line connecting the switching elements 19A and 19B and an anode line 20a of the smoothing capacitor 20. The motor energizing circuit 25 is arranged between the smoothing capacitors 24 and 20.

The control circuit 1 includes a ROM 29 which stores therein on-off operation patterns for the switching elements 26u to 26z of the bi-directional motor power-converting circuit 26 under PWM control. Specifically, the ROM 29 reads out data on pulse patterns formed with logic 1s and/or 0s in response to a timing signal outputted from a counter 30 through an address line. The counter 30 is responsive to a clock signal from a PLL (Phase-locked loop) pulse generator 31 to provide the timing signal to the ROM 29. The frequency of the clock signal of the PLL pulse generator 31 is controlled by a timer LSI 32. A latch 33 synchronizes the output data provided from the ROM 29. A gate driver 34 is responsive to a logic output from the latch 33 to drive a photocoupler circuit 35 to provide signals for controlling on-off conditions of the switching elements of the bi-directional motor power-converting circuit 26.

The control circuit 1 also includes a power factor-improving IC 36 which may be made up of the FA5331 device manufactured by Fuji-Denki Co., Ltd. in Japan. The power factor-improving IC 36 provides a pulse-width control output to a gate driver 38 through a pattern switching circuit 37. The gate driver 38 then amplifies it to drive a photocoupler circuit 39. The photocoupler circuit 39 provides signals to the bi-directional supply power-converting circuit 22 for controlling on-off timings of the switching elements 22U, 22V, 22X, and 22Y.

The power factor-improving IC 36 receives sensor signals outputted from a V-sensor 40, an I-sensor 41, and a first CV-sensor 42, respectively. The V-sensor 40 includes, for example, an isolation transistor which detects a voltage waveform of the power supply 21. The I-sensor 41 includes, for example, a hall current sensor which detects a current waveform of the power supply 21. The CV-sensor 42 includes, for example, an assembly consisting of V-F and F-V converters which detects a charged voltage of the smoothing capacitor 24. The power factor-improving IC 36 controls, based on the sensor inputs, the bi-directional supply power-converting circuit 22 so as to function as a step-up converter in cooperation with the reactor 23 in a forward operation which charges the smoothing capacitor 24 until a constant voltage level is reached during power running of the motor 28 at a current containing a decreased harmonic current which is similar to a voltage waveform of the AC power supply 21. The power factor-improving IC 36 also controls the bi-directional supply power-converting circuit 22 so as to function as a step-down converter in a reverse operation which discharges the smoothing capacitor 24 to keep a given constant voltage level during a regenerating operation of the motor 28.

An attenuator 44 switches the amplitude of a signal outputted from the I-sensor 41. A differential amplifier 45 subtracts a reference voltage of a reference voltage source 46 from a signal level provided by the CV-sensor 42. An analog switch 43 receives signals from the attenuator 44 and the differential amplifier 45 and is responsive to a signal from an I/O-LSI 47 to perform a switching operation along with the pattern switching circuit 37 for allowing the bi-directional supply power-converting circuit 22 to operate both in the forward operation and in the reverse operation under the same control of the power factor-improving IC 36.

A positive/negative cycle detector 48 detects positive and negative cycles of the AC power supply 21 to provide a logic signal to the pattern switching circuit 37. An oscillator 51 provides a reference clock to the PLL pulse generator 31 through the timer LSI 32.

The control unit 100 further includes a second CV-sensor 15, a photocoupler circuit 18, a gate driver 14, a voltage switching circuit 50, a step-down converter 16, a step-up converter 17, a D-A/A-D LSI 49 having D-A and A-D converter functions.

The second CV-sensor 15 includes the same structure as that of the first CV-sensor 42 and detects a charged voltage of the smoothing capacitor 20 to provide a signal indicative thereof to the step-down converter 16.

The step-up converter 17 and the step-down converter 16 both may be made up of a known DC-DC converter IC such as HA17524 device manufactured by HITACHI Co., Ltd. or μpc494 device manufactured by NEC in Japan. The step-up converter 17 controls on-off operations of the switching element 19B. The step-down converter 16 controls on-off operations of the switching element 19A. Sensor signals from the first and second CV-sensors 42 and 15 are inputted to the step-up converter 17 and the step-down converter 16 as direct current control feedback signals, respectively, and also inputted to the D-A/A-D LSI 49. The D-A/A-D LSI 49 provides direct current control reference signals to the step-up converter 17 and the step-down converter 16. The CPU 55 performs the step-up control for the smoothing capacitor 24 and the step-down control for the smoothing capacitor 20. The step-up converter 17 and the step-down converter 16 provide pulse-width control outputs to the voltage switching circuit 50 to select the step-up operation or the step-down operation. The voltage switching circuit 50 then outputs a control signal to the gate driver 14 for selectively turning on and off either of the switching elements 19A and 19B through the photocoupler circuit 13. When it is required to decrease the voltage of the smoothing capacitor 24 to charge the smoothing capacitor 20, the switching element 19A is activated, while when it is required to increase the voltage of the smoothing capacitor 20 to charge the smoothing capacitor 24, the switching element 19A is activated.

Figure 2:
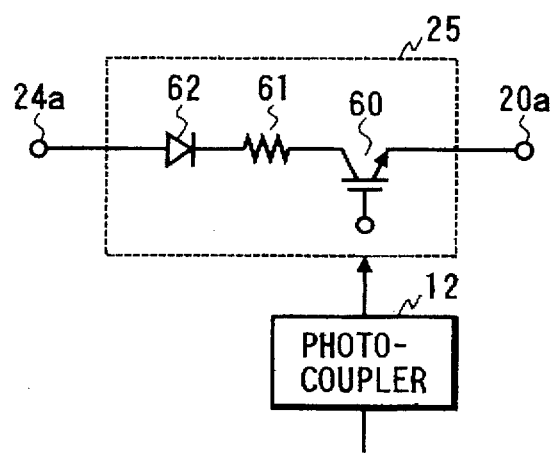
FIG. 2 is a circuit diagram which shows a structure of a motor energizing circuit designed to provide an initial energy to an electric motor at the start of a regenerating mode of operation.

The motor energizing circuit 25 includes, as shown in FIG. 2, a switching element 60, a resistor 61, and a diode 62. The switching element 60 may be made up of an IGBT, a GTO, or a transistor, and an operation thereof is controlled by a photocoupler circuit 12 of the control circuit 1. The resistor 61 and the diode 62 are connected in series with the switching element 60. The resistor 61 is provided to regulate the impedance. The diode 62 is provided to prevent the current from flowing in the reverse direction.

The photocoupler circuit 12 is controlled by a gate driver 11. The gate driver 11 is controlled by the centrifuge control CPU 55 through the I/O-LSI 47.

The control circuit 1 further includes a power control circuit 52 which supplies drive power to gate drivers 34, 38, and 14 for restricting ON signals from being applied to the switching elements of the bi-directional supply power-converting circuit 22, the direct current power-converting circuit 19, and the bi-directional motor power-converting circuit 26 when a malfunction such as an so-called arm-short circuit wherein switching elements arranged on an upper arm and the switching elements arranged on a lower arm are activated simultaneously, or overcurrent of the circuits 22, 19, and 26 takes place at the time of switching of operation control, or until all system operations are placed in starting conditions following activation of the AC power supply 21.

A speed sensor 53 is disposed adjacent the rotor 27 to provide a signal every rotation of the rotor 27 to a counter 54. The counter 54 counts the signals from the speed sensor 53 to determine the speed of the rotor 27. The timer LSI 32, the I/O-LSI 47, the D-A/A-D LSI 49, and the counter 54 are controlled by the CPU 55 for controlling on-off operations of the switching elements of the bi-directional supply power-converting circuit 22, the direct current power-converting circuit 19, and the bi-directional motor power-converting circuit 26.

As can be seen from the above, the V-sensor 40, the I-sensor 41, the first CV-sensor 42, the second CV-sensor 15, and the photocoupler circuits 35, 39, 13, and 12 constitute a signal isolating means for isolating in reference voltage a power circuit including the bi-directional supply power-converting circuit 22, the direct current power-converting circuit 19, the bi-directional motor power-converting circuit 26, and the motor energizing circuit 25 from a signal circuit of the control circuit 1 for preventing electrical noise produced by high-speed switching operations of the converting circuits 22, 19, and 26 from causing a malfunction of the control circuit 1.

An operation of the above discussed motor control system will be described below with reference to FIG. 3.

Figure 3:
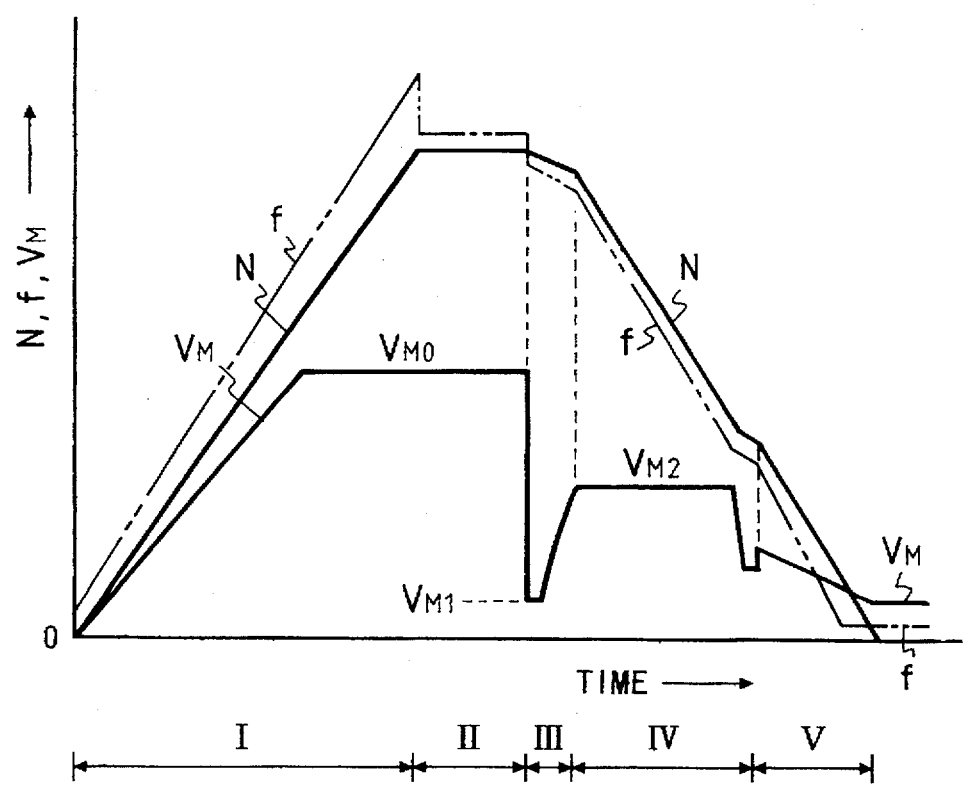
FIG. 3 is a time chart which shows operation modes of an electric motor.

FIG. 3 is a graph which shows variations in speed N of the centrifugal rotor 27, i.e., the motor 28, frequency f of a signal outputted from the motor power-converting circuit 26 to the motor 28, and voltage VM applied to the motor 28 in operation modes I, II, III, IV, and V.

In the operation mode I, the motor 28 starts to rotate the rotor 27 and accelerates it until a maximum speed is reached. Specifically, the CPU 55 controls the I/O-LSI 47, the D-A/A-D LSI 49, and the timer LSI 32 to activate the direct current power-converting circuit 19 and the bi-directional motor power-converting circuit 26. The direct current power-converting circuit 19 works as the step-down converter to decrease the voltage of the smoothing capacitor 24 which is charged at a voltage level derived by increasing the voltage of the AC power supply 21 through the forward operation of the bi-directional supply power-converting circuit 22, while charging the smoothing capacitor 20 to store the voltage proportional to the voltage VM to be applied to the motor 28. The bi-directional motor power-converting circuit 26 performs positive slip frequency control for performing v/f control under the above operations according an increase in speed N of the motor 28. When the voltage VM applied to the motor 28 reaches a rated voltage according to the increase in speed N of the motor 28, it will cause the frequency f to be increased so that the voltage VM is maintained constant. The switching elements 22U to 22Y of the bi-directional supply power-converting circuit 22 are controlled in the on-off operations by the power factor-improving IC 36 based on signal inputs from the V-sensor 40, the I-sensor 41, and the CV-sensor 42 and works as the step-up converter to decrease the harmonic content of the current flowing therethrough which is similar to the waveform of the voltage of the AC power supply 21. In the operation of the step-down converter provided by the direct current power-converting circuit 19, the CPU 55 outputs a reference voltage to the step-down converter 16 through the D-A/A-D LSI 49. The step-down converter 16 then corrects the reference voltage to agree with a feedback voltage of the CV-sensor 15 and controls the on-off operations of the switching elements 19A for regulating the voltage VM to be supplied to the motor 28.

In the operation mode II, the rotor 27 is held at the maximum speed. Similar to the operation mode I, the bi-directional supply power-converting circuit 22 works as the step-up converter to charge the smoothing capacitor 24 so as to provide a given constant voltage. The direct current power-converting circuit 19 works as the step-down converter to modify the voltage of the smoothing capacitor 20 to a constant level smaller than that of the smoothing capacitor 24 so that the voltage VM for the motor 28 is kept at a level VM0. The holding of the maximum speed of the rotor 27 is achieved in the following manner. First, a difference between a target speed and an actual speed of the rotor 27 monitored by the speed sensor 53 and the counter 54 is determined by a PID operation through the CPU 55. The motor power-converting circuit 26 then determines the frequency f of the power to be supplied to the motor 28 based on the difference between the target speed and the actual speed of the rotor 27 and provides a control signal to the timer LSI 32. The timer LSI 32 controls the PLL pulse generator 31 to provide a given frequency to the counter 30.

In the operation modes III and IV, a regenerating brake is applied to the rotor 27 (i.e., the motor 28) to decelerate it quickly. Specifically, the power factor-improving IC 36 controls the on-off operations of the switching elements 22U to 22Y of the bi-directional supply power-converting circuit 22 so as to work as the step-down converter in the reverse operation. The step-down converter restricts the elevation in charged voltage of the smoothing capacitor 24 to maintain it at a constant level for returning the current, which is similar to the waveform of the voltage of the AC power supply 21, to the AC power supply 21. The motor power-converting circuit 26 converts the rotational power of the rotor 27 (i.e., the motor 28) into electric energy under negative slip frequency control and the v/f control to charge the smoothing capacitor 20. The direct current power-converting circuit 19 works as the step-up converter through the on-off operation of the switching element 19B under control of the step-up converter 17 to elevate the voltage of the smoothing capacitor 20 for charging the smoothing capacitor 24.

It is advisable that the voltage level of the smoothing capacitor 24 after being charged by the activities of the direct current power-converting circuit 19 working as the step-up converter be slightly greater than the voltage level of the smoothing capacitor 24 maintained constant by the activities of the bi-directional supply power-converting circuit 22 working as the step-down converter.

In order to place the motor 28 in a regenerating operation in the operation mode III, it is necessary to provide an initial energizing energy to the motor 28. When the motor control enters the operation mode III, the bi-directional motor power-converting circuit 26 is first turned off, the bi-directional supply power-converting circuit 22 is switched in operation to work in the reverse operation, and then the direct current power-converting circuit 19 is controlled so as to work as the step-up converter. However, since the capacity of the smoothing capacitor 20 is relatively small, the electric energy stored in the smoothing capacitor 20 is insufficient for energizing the motor 28 at the start of the operation mode III. Accordingly, in this embodiment, the CPU 55 activates the motor energizing circuit 25 to apply a higher voltage to both ends of the smoothing capacitor 20 for a given period of time. Specifically, the I/0 LSI 47 turns on the switching element 60 of the motor energizing circuit 25 through the gate driver 11 and the photocoupler 12 to transfer the electric energy stored in the smoothing capacitor 24 to the smoothing capacitor 20 through the diode 62 and the resistor 61 for providing an energizing current to the motor 28. The charge of the smoothing capacitor is accomplished by the circulating rectifier made up of the diode bridge of the bi-directional supply power-converting circuit 22.

Upon initiation of the regenerating operation of the motor 28, the voltage VM1 applied to the motor 28 is increased to the voltage VM2, and then the motor control system enters the operation mode IV. In the operation mode IV, the CPU 55 turns off the switching element 60 to deactivate the motor energizing circuit 25. The motor power-converting circuit 26 is turned on to perform the negative slip frequency control to convert mechanical energy produced by rotation of the rotor 27 into electrical energy and supplies it to the AC power supply 21. The speed of the motor 38 is thus decreased quickly.

The holding of the motor voltage VM at a higher level (i.e., the voltage VM2) may be achieved by changing an output pattern of the ROM 29 through the I/O LSI 47 to decrease the pulse width in the PWM control of the motor power-converting circuit 26. At the end of the operation mode IV, the speed of the motor 28 is decreased to the extent that it is difficult to maintain the regenerating operation. This results in, as shown in FIG. 3, decreased in voltage VM of the motor 28. The motor control system then enters the operation mode V.

In the operation mode V, the motor 28 is controlled to decrease the speed of the rotor 27 slowly to zero. Since the speed of the motor 28 is low, a direct-current brake is applied to the motor 28 in stead of an alternating-current brake for decreasing the speed thereof smoothly. Therefore, the bi-directional supply power-converting circuit 22 is switched from the reverse operation to the forward operation to serve as the step-up converter. The direct current power-converting circuit 19 is switched in operation from the step-up converter to the step-down converter. The motor power-converting circuit 26 supplies a braking direct current to the motor 28 by, for example, switching between a first operation mode wherein the switching elements 26V, 26X, AND 26Z are turned on, while the others are turned off and a second operation mode wherein the switching elements 26U, 26W, and 26Y are turned on, while the others are turned off. This is achieved by cyclically changing an address block read out of the ROM 29 through the counter 30 under control of the I/O LSI 47. In the operation mode V, the frequency f shown in FIG. 3 represents a switching frequency and not the slip frequency. The voltage of the smoothing capacitor 20 is decreased according to decrease in speed N of the motor 28. The voltage VM applied to the motor 28 is also decreased for stopping the motor 28.

Figure 4:
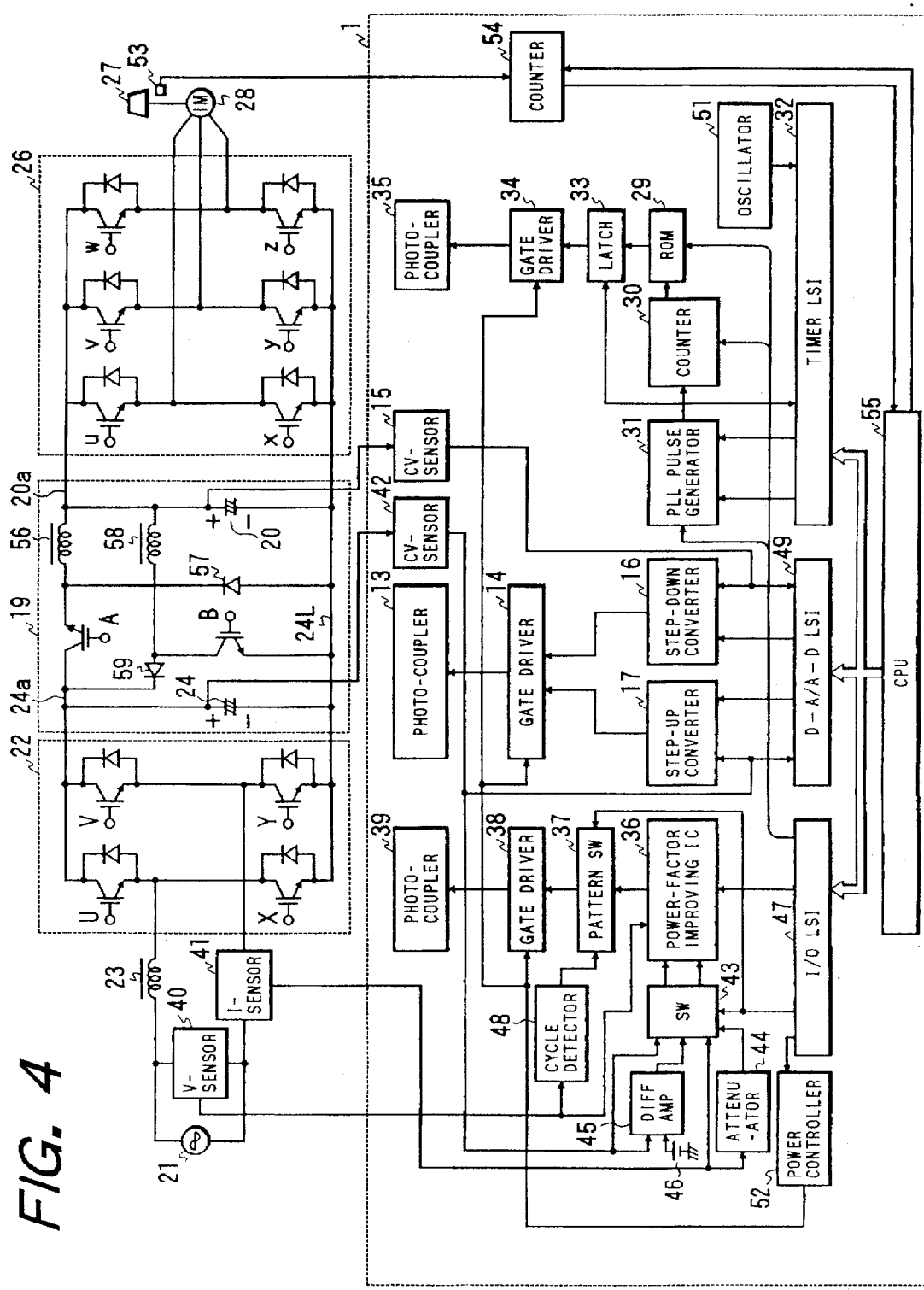
FIG. 4 is a block diagram which shows a motor control system for a centrifuge according to the second embodiment of the invention.

FIG. 4 shows an alternative embodiment of the motor control system of the invention. The same reference numbers as employed in the first embodiment indicate the same parts, and explanation thereof in detail will be omitted here.

This embodiment is different from the first embodiment in internal structure of the direct current power-converting circuit 19. In the first embodiment, when the direct current power-converting circuit 19 works as the step-down converter, the switching element 19A, the choke coil 18, the smoothing capacitor 20, and the circulating rectifier diode connected to the switching element 19B operate, while when it works as the step-up converter, the switching element 19B, the choke coil 18, the smoothing capacitor 24, and the circulating rectifier diode connected to the switching element 19A operate. In other words, the direct current power-converting circuit 19 cannot work as the step-up converter and the step-down converter simultaneously. Thus, the motor control system of the first embodiment, as described above, activates the motor energizing circuit 25 for energizing the motor 28 temporarily at the start of the regenerating operation in the operation mode III.

In the second embodiment shown in FIG. 4, the direct current power-converting circuit 19 is designed to work as the step-up converter and the step-down converter at the same time. Specifically, the direct current power-converting circuit 19 includes choke coils 56 and 58 and flyback diodes 57 and 59. The step-down converter is formed with the switching element 19A, the choke coil 56, the smoothing capacitor 20, and the flyback diode 57, while the step-up converter is formed with the switching element 19B, the choke coil 58, the smoothing capacitor 24, and the flyback diode 59. This allows the direct current power-converting circuit 19 to work as the step-up converter and the step-down converter simultaneously.

Figure 5:
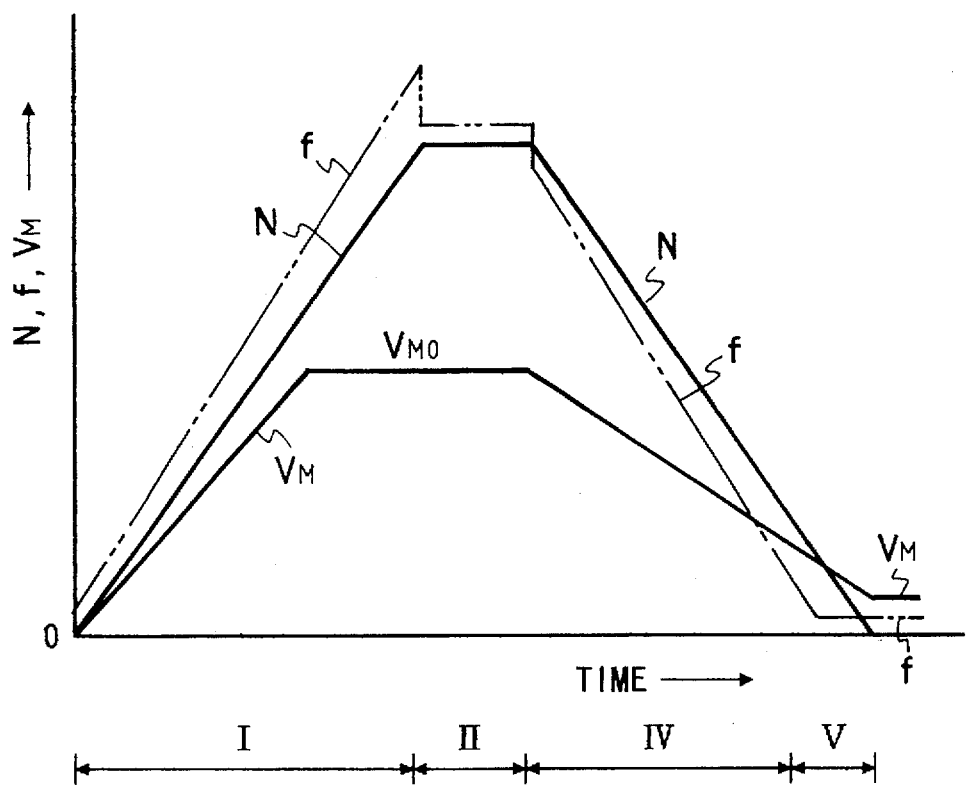
FIG. 5 is a time chart which shows operation modes of an electric motor of the second embodiment of the invention.

FIG. 5 shows variations in speed N of the motor 28, frequency f of a signal outputted from the motor power-converting circuit 26 to the motor 28, and voltage VM applied to the motor 28 in operation modes I, II, IV, and V. The operation modes I, II, and V in FIG. 5 corresponds to the operation modes I, II, and V in FIG. 3, while the operation modes IV in FIG. 5 corresponds to a combination of the operation modes III and IV in FIG. 3.

In the operation mode IV in FIG. 5, a regenerating brake is applied to the motor 28 to decelerate the rotor 27 quickly. Specifically, the bi-directional supply power-converting circuit 22 works in the reverse operation as the step-down converter in the same manner as that in the first embodiment for returning the current, which is similar to a voltage waveform of the AC power supply 21, to the AC power supply 21. The direct current power-converting circuit 19 performs the dual function of the step-up converter and the step-down converter in the following manner. when the motor power-converting circuit 26 performs the negative slip frequency control, the step-down converter provided by the direct current power-converting circuit 19 supplies the current to the motor 28 for starting the regenerating operation thereof. This allows the regenerating operation of the motor 28 to be performed within a relatively short period of time. The rotation of the rotor 27 is converted into electric energy, and a voltage level thereof is elevated by the step-up converter provided by the direct current power-converting circuit 19 so that the smoothing capacitor 24 is charged at a high voltage. The electric energy is then supplied to the AC power supply 21 through the hi-directional supply power-converting circuit 22.

The power supply from the AC power supply 21 when the direct current power-converting circuit 19 works as the step-down converter during the reverse operation of the hi-directional supply power-converting circuit 22 is accomplished by the activities of the bridge made up of the circulating rectifier diodes connected in parallel to the switching elements 22U, 22V, 22X, and 22Y of the hi-directional supply power-converting circuit 22.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A power control apparatus for controlling power supplied to an electric motor employed in a centrifuge comprising:

a bi-directional supply power-converting circuit connected to an a.c. power supply, designed to convert a.c. current into d.c. current and vice versa and to reduce harmonic components contained in the current passing therethrough, said bi-directional supply power-converting circuit functioning as a step-up converter and a step-down converter, the step-up converter increasing a voltage level of the current flowing therethrough during conversion from the d.c. current into the a.c. current, the step-down converter decreasing a voltage level of the current flowing therethrough during conversion from the a.c. current into the d.c. current;

a bi-directional motor power-convening circuit connected to said bi-directional supply power-converting circuit for providing power to the electric motor in a power running mode of motor operation and also providing power produced by the electric motor in a regenerating mode of motor operation to said bi-directional supply power-converting circuit;

a d.c. power-converting circuit disposed between said bi-directional supply power-converting circuit and said bi-directional motor power-converting circuit, designed to work as a step-down converter which decreases a voltage level of an output from said bi-directional supply power-converting circuit to said bi-directional motor power-converting circuit and a step-up converter which increases a voltage level of an output from said bi-directional motor power-converting circuit to said bi-directional supply power-converting circuit;

a motor energizing circuit disposed in parallel to said d.c. power-converting circuit to provide a given level of electric power to the electric motor to activate the electric motor in the regenerating mode; and a control circuit controlling operations of said bi-directional supply power-converting circuit, said bi-directional motor power-converting circuit, said d.c. power-converting circuit, and said motor energizing circuit to selectively activate the electric motor in the power running mode and the regenerating mode.

2. A power control apparatus as set forth in claim 1, further comprising a first smoothing capacitor and a second smoothing capacitor, and wherein said bi-directional supply power-converting circuit includes rectifying elements connected to form a circular rectifying circuit and switching elements each connected to one of the rectifying elements in parallel, said bi-directional supply power-converting circuit being connected at an ac terminal to the a.c. power supply and at a d.c. terminal to said first smoothing capacitor for charging said first smoothing capacitor, said bi-directional motor power-converting circuit including rectifying elements connected to form a circular rectifying circuit and switching elements each connected to one of the rectifying elements in parallel, said bi-directional motor power-converting circuit being connected at an a.c. terminal to the motor and at a d.c. terminal to said second smoothing capacitor, said control circuit controlling, in the power running mode, the switching elements of said bi-directional motor power-converting circuit with given operational timing to supply power to the motor, and also controlling said d.c. power-converting circuit to function as the step-down converter acting on the first smoothing capacitor for charging said second capacitor at a preselected level, in the regenerating mode wherein said bi-directional motor power-converting circuit charges said second smoothing capacitor with power regenerated by the motor, said control circuit controlling the switching elements of said bi-directional supply power-converting circuit with given operational timing for returning the power regenerated by the motor back to said a.c. power supply, and also controlling said d.c. power-converting circuit to function as the step-up converter acting on the second smoothing capacitor for allowing said first capacitor to be charged at a given level.

3. A power control apparatus for controlling power supplied to an electric motor employed in a centrifuge comprising:

a hi-directional supply power-convening circuit connected to an a.c. power supply, designed to convert a.c. current into d.c. current and vice versa and to reduce harmonic components contained in the current passing therethrough, said bi-directional supply power-converting circuit functioning as a step-up converter and a step-down converter, the step-up converter increasing a voltage level of the current flowing therethrough during conversion from the d.c. current into the a.c. current, the step-down converter decreasing a voltage level of the current flowing therethrough during conversion from the a.c. current into the d.c. current;

a bi-directional motor power-converting circuit connected to said bi-directional supply power-converting circuit for providing power to the electric motor in a power running mode of motor operation and also prodding power produced by the electric motor in a regenerating mode of motor operation to said bi-directional supply power-converting circuit;

a d.c. power-converting circuit disposed between said bi-directional supply power-converting circuit and said bi-directional motor power-converting circuit, designed to work as a step-down converter which decreases a voltage level of an output from said bi-directional supply power-converting circuit to said bi-directional motor power-converting circuit and a step-up converter which increases a voltage level of an output from said bi-directional motor power-converting circuit to said bi-directional supply power-converting circuit, the step-down converter also serving to provide energizing energy to the motor for starting the regenerating mode; and a control circuit controlling operations of said bi-directional supply power-converting circuit, said bi-directional motor power-converting circuit, and said d.c. power-converting circuit to selectively activate the electric motor in the power running mode and the regenerating mode.

4. A power control apparatus as set forth in claim 3, further comprising a first smoothing capacitor and a second smoothing capacitor, and wherein said bi-directional supply power-converting circuit includes rectifying elements connected to form a circular rectifying circuit and switching elements each connected to one of the rectifying elements in parallel, said bi-directional supply power-converting circuit being connected at an ac terminal to the a.c. power supply and at a d.c. terminal to said first smoothing capacitor for charging said first smoothing capacitor, and wherein said bi-directional motor power-converting circuit includes rectifying elements connected to form a circular rectifying circuit and switching elements each connected to one of the rectifying elements in parallel, said bi-directional motor power-convening circuit being connected at an ac terminal to the motor and at a d.c. terminal to said second smoothing capacitor, and wherein said control circuit controls, in the power running mode, the switching elements of said bi-directional motor power-convening circuit with given operational timing to supply power to the motor and also controls said d.c. power-converting circuit to function as the step-down converter acting on the first smoothing capacitor for charging said second capacitor at a preselected level, in the regenerating mode wherein said bi-directional motor power-converting circuit charges said second smoothing capacitor with power regenerated by the motor, said control circuit controlling the switching elements of said bi-directional supply power-converting circuit with given operational timing for returning the power regenerated by the motor back to said a.c. power supply and also controlling said d.c. power-converting circuit to function as the step-up converter acting on the second smoothing capacitor for allowing said first capacitor to be charged at a given level, and wherein when the motor enters the regenerating mode through said bi-directional motor power-converting circuit, said d.c. power-converting circuit works as the step-down converter for providing the energizing energy to the motor for starting the regenerating mode.

* * * * *